(12) United States Patent
Nishino (10) Patent No.: US 8,907,527 B2
(45) Date of Patent: Dec. 9, 2014

(54) CONTACTLESS POWER-FEED EQUIPMENT

(75) Inventor: Shuzo Nishino, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 587 days.

(21) Appl. No.: 13/322,929

(22) PCT Filed: Jun. 17, 2010

(86) PCT No.: PCT/JP2010/060259
§ 371 (c)(1),
(2), (4) Date: Nov. 29, 2011

(87) PCT Pub. No.: WO2010/147168
PCT Pub. Date: Dec. 23, 2010

(65) Prior Publication Data
US 2012/0068552 A1    Mar. 22, 2012

(30) Foreign Application Priority Data
Jun. 18, 2009    (JP) .................................. 2009-144795

(51) Int. Cl.
*H01F 27/42*    (2006.01)
*H02J 5/00*    (2006.01)
*H01F 38/14*    (2006.01)
*H02M 3/337*    (2006.01)

(52) U.S. Cl.
CPC ............. *H02J 5/005* (2013.01); *Y02B 70/1433* (2013.01); *H01F 38/14* (2013.01); *H02M 3/3372* (2013.01)
USPC ....................................................... 307/104

(58) Field of Classification Search
USPC ....................................................... 307/104
See application file for complete search history.

(56) References Cited

U.S. PATENT DOCUMENTS

| 5,528,113 | A |   | 6/1996 | Boys et al. | ........................ | 318/16 |
| 5,709,291 | A | * | 1/1998 | Nishino et al. | ................... | 191/10 |

(Continued)

FOREIGN PATENT DOCUMENTS

| CN | 86 1 05826 | 5/1987 | ............. F02M 51/02 |
| CN | 1625017 | 6/2005 | ............. H02J 17/00 |

(Continued)

OTHER PUBLICATIONS

Office Action (dated Sep. 24, 2013) issued in connection with corresponding Japanese Patent Application No. 2011-519827.

(Continued)

*Primary Examiner* — Jared Fureman
*Assistant Examiner* — Duc M Pham
(74) *Attorney, Agent, or Firm* — Kusner & Jaffe (57) ABSTRACT

In order to provide contactless power-feed equipment that can avoid excessive energy consumption upon switching, a primary side includes a DC power-supply device 11, a power-feed device 12, and a power-feed unit 13 and a secondary side includes a power-receiving unit 15. The power-feed device 12 includes: an insulating transformer 24 including a primary coil 22 with a center tap 22a fed with a DC current and a secondary coil 23 connected to the power-feed unit 13; a resonance capacitor 25 connected in parallel with the secondary coil 23 of the insulating transformer 24; a first diode 26 and a first Zener diode 29 that are connected to one end 22b of the primary coil 22; a second diode 27 and a second Zener diode 32 that are connected to the other end 22c of the primary coil 22; a first transistor 35 connected to the first diode 26, and a second transistor 36 connected to the second diode 27.

11 Claims, 7 Drawing Sheets

(56) References Cited

U.S. PATENT DOCUMENTS

| | | | |
|---|---|---|---|
| 6,483,202 B1 * | 11/2002 | Boys | 307/17 |
| 7,119,311 B2 * | 10/2006 | Makoto | 219/661 |
| 8,094,467 B2 * | 1/2012 | Wang | 363/21.02 |
| 2008/0291709 A1 | 11/2008 | Kawasaki | 363/77 |

FOREIGN PATENT DOCUMENTS

| | | | | |
|---|---|---|---|---|
| CN | 101123399 | 2/2008 | | H02M 3/28 |
| EP | 0 209 073 | 1/1987 | | F02M 17/16 |
| JP | 3-80692 | 8/1991 | | H02M 7/5383 |
| JP | 2667054 | 6/1997 | | H02J 17/00 |
| JP | 2002-508916 | 3/2002 | | B60L 11/18 |
| WO | WO 92/17929 | 10/1992 | | H02J 5/00 |
| WO | WO 98/50993 | 11/1998 | | H02J 1/00 |

OTHER PUBLICATIONS

International Search Report for International Application No. PCT/JP2010/060259, Sep. 21, 2010.

International Preliminary Report on Patentability (PCT/IPEA/409) for International Application No. PCT/JP2010/060259, Jun. 18, 2009.

Office Action (dated Aug. 8, 2013) issued in connection with corresponding Chinese Patent Application No. 2010-80017379.7.

* cited by examiner

CONTACTLESS POWER-FEED EQUIPMENT

FIELD OF INVENTION

The present invention relates to contactless power-feed equipment and particularly relates to a power-supply device that supplies an AC current to an induction line or an induction coil.

BACKGROUND OF THE INVENTION

Patent Literature 1 discloses an example of a conventional power-supply device that supplies an AC current to the induction line.

The power-supply device includes: a DC choke fed with a DC current from the positive output terminal of a DC power supply; a high-frequency transformer including a primary coil having a center tap fed with a DC current through the DC choke and a secondary coil connected to the induction line; a capacitor connected in parallel with both ends of the primary coil of the high-frequency transformer; a first switch connected between one end of the primary coil of the high-frequency transformer and the negative output terminal of the DC power supply; and a second switch connected between the other end of the primary coil of the high-frequency transformer and the negative output terminal of the DC power supply.

The primary coil and the secondary coil of the high-frequency transformer, the induction line, and the capacitor are selected so as to form a resonance circuit resonating at a predetermined frequency. The first switch and the second switch are alternately switched by a switching controller every 180° such that a current passes through the secondary coil at the predetermined frequency. The number of windings on the secondary side of the high-frequency transformer is set at one to increase a current passing through the induction line and minimize the influence of a change of load.

Thus, the high-frequency transformer provides insulation from the DC power supply and supplies a large current of a sinusoidal waveform at the predetermined frequency to the induction line.

CITATION LIST

Patent Literature

Patent Literature 1: Japanese Patent No. 2667054 (FIG. 6)

SUMMARY OF INVENTION

Technical Problem

In conventional contactless power-feed equipment, the first switch and the second switch should be switched at phases shifted by exactly 180°. However, if the switching timing is shifted so that both switches are turned on simultaneously, a capacitor connected in series with the switches forms a loop circuit that discharges electricity, resulting in excessive energy consumption. Moreover, a noise current generated by the switching passes through the capacitor and leads to excessive energy consumption. Furthermore, a switching controller is required to switch the first and second switches.

An object of the present invention is to provide contactless power-feed equipment that can prevent excessive energy consumption upon switching and eliminate the need for a switching controller.

Solution to Problem

In order to attain the object, a first aspect of the present invention is contactless power-feed equipment including an induction line placed along a travel path of a movable body and fed with an AC current, or an induction coil that is disposed at a predetermined position for holding a device and fed with an AC current, the movable body including a power-receiving coil on which an electromotive force is induced by a magnetic flux generated on the induction line, or the device including a power-receiving coil on which an electromotive force is induced by a magnetic flux generated on the induction coil, the contactless power-feed equipment including: a DC power-supply device that supplies a DC current; a DC choke having one end connected to the positive output terminal of the DC power-supply device; an insulating transformer including a center-tapped primary coil having a center tap connected to the other end of the DC choke and a secondary coil connected to one of the induction line and the induction coil; a resonance capacitor that is connected in parallel with the secondary coil and forms a resonance circuit with one of the induction line and the induction coil at a predetermined frequency; a first diode having an anode connected to one end of the center-tapped primary coil; a second diode having an anode connected to the other end of the center-tapped primary coil; a first switching element connected between the cathode of the first diode and the negative output terminal of the DC power-supply device; and a second switching element connected between the cathode of the second diode and the negative output terminal of the DC power-supply device, wherein the first switching element and the second switching element are alternately driven so as to pass the AC current through the secondary coil at the predetermined frequency.

With this configuration, the DC current is supplied from the DC power-supply device to the center-tapped primary coil through the DC choke to drive the first switching element. At this point, the DC current passes through the first diode and the first switching element from the one end of the center-tapped primary coil. Then, the second switching element is driven to pass the DC current from the other end of the center-tapped primary coil through the second diode and the second switching element. The first switching element and the second switching element are alternately driven so as to alternately pass a current from the one end and the other end of the center-tapped primary coil, leading to an alternately reversed current passing through the secondary coil. At this point, the first switching element and the second switching element are alternately driven so as to pass the AC current through the secondary coil at the predetermined frequency. Thus, the AC current passes through one of the induction line and the induction coil from the secondary coil at the predetermined frequency.

Moreover, even if the switching timing of the switching elements is shifted so that the elements are simultaneously turned on, a loop circuit including the switching elements is not fed with a circulating current in response to the operations of the switching elements, reducing an energy loss. This is because a capacitor connected to the switching elements is absent and the first and second diodes are provided. Furthermore, the recovery current of the diodes causes an instant current flow at the application of a reverse voltage. Since only the primary coil is connected, it is possible to prevent the circulating current from passing through the loop circuit, reducing an energy loss.

A second aspect of the present invention is the first aspect of the present invention, in which the first switching element and the second switching element each include a transistor, the contactless power-feed equipment includes: a first Zener diode having a cathode connected to the one end of the center-tapped primary coil and the base of the transistor forming the second switching element and an anode connected to the negative output terminal of the DC power-supply device; and a second Zener diode having a cathode connected to the other end of the center-tapped primary coil and the base of the transistor forming the first switching element and an anode connected to the negative output terminal of the DC power-supply device, a current passing through the first Zener diode from the one end of the center-tapped primary coil drives the transistor forming the second switching element, and a current passing through the second Zener diode from the other end of the center-tapped primary coil drives the transistor forming the first switching element.

With this configuration, when the current passes through the first Zener diode from the one end of the center-tapped primary coil, the Zener voltage of the first Zener diode is applied to the base of the second transistor to drive the second transistor. A current passes through the second diode having the cathode connected to the second transistor, so that a current flow to the primary coil is reversed. Then, the base voltage of the second transistor becomes 0, the Zener voltage of the second Zener diode is applied to the base of the first transistor to drive the first transistor, and a current passes through the first diode having the cathode connected to the first transistor, so that a current flow to the primary coil is reversed. In this way, the first transistor and the second transistor are alternately turned on. The direction of the current flow to the primary coil is reversed each time the transistors are switched. Accordingly, a current passing through the secondary coil is alternately reversed. The current flow is maximized at the predetermined frequency that allows a circuit including the resonance capacitor and one of the induction line and the induction coil to form a resonance circuit, so that the first transistor and the second transistor are driven at the predetermined frequency of the circuit. In other words, the AC current is supplied by self-oscillation to one of the induction line and the induction coil at the predetermined frequency of the circuit. Thus, a switching controller for driving the transistors (switching elements) is not necessary.

A third aspect of the present invention is the first or second aspect of the present invention, in which the AC current passing through one of the induction line and the induction coil has a frequency that falls below the predetermined frequency in the presence of one of the movable body and the power-receiving coil of the device.

With this configuration, the resonance capacitor and one of the induction line and the induction coil form the resonance circuit at the predetermined frequency. The impedance of the circuit increases in the presence of one of the movable body and the power-receiving coil of the device, so that a resonance frequency decreases and a self-oscillation frequency falls below the predetermined frequency, accordingly.

A fourth aspect of the present invention is the third aspect of the present invention, in which a load connected to the power-receiving coil has a rating that is set based on the reduced frequency.

With this configuration, the load fed with power from one of the movable body and the power-receiving coil of the device has a predetermined rating that enables driving at the reduced frequency.

A fifth aspect of the present invention is any one of the first to fourth aspects of the present invention, in which the induction coil and the power-receiving coil are each wound around both legs of cores formed in channel shape in side view, and a voltage induced on the power-receiving coil is limited to a predetermined voltage or lower because of the saturation of the cores.

With this configuration, the voltage of the power-receiving coil is not higher than the predetermined voltage because of the saturation of the cores. Thus, the received power of the power-receiving coil is limited, preventing an overload on the induction coil.

A sixth aspect of the present invention is the fifth aspect of the present invention, in which the core of the power-receiving coil is smaller than the core of the induction coil.

With this configuration, the core of the power-receiving coil is smaller than the core of the induction coil. Thus even if the position of the held core of the power-receiving coil is displaced from the position of the core of the induction coil, a voltage required for the power-receiving coil is induced.

A seventh aspect of the present invention is contactless power-feed equipment including an induction line placed along a travel path of a movable body and fed with an AC current, or an induction coil that is disposed at a predetermined position for holding a device and fed with an AC current, the movable body including a power-receiving coil on which an electromotive force is induced by a magnetic flux generated on the induction line, or the device including a power-receiving coil on which an electromotive force is induced by a magnetic flux generated on the induction coil, the contactless power-feed equipment including: a DC power-supply device that supplies a DC current; a DC choke having one end connected to the positive output terminal of the DC power-supply device; an insulating transformer including a center-tapped primary coil having a center tap connected to the other end of the DC choke and a secondary coil connected to one of the induction line and the induction coil; a resonance capacitor that is connected in parallel with the secondary coil and forms a resonance circuit with one of the induction line and the induction coil at a predetermined frequency; a first switching element including a transistor connected between one end of the center-tapped primary coil and the negative output terminal of the DC power-supply device; a second switching element including a transistor connected between the other end of the center-tapped primary coil and the negative output terminal of the DC power-supply device; a first constant current diode having an anode connected to the one end of the center-tapped primary coil; a first Zener diode having a cathode connected to the cathode of the first constant current diode and the base of the transistor forming the second switching element and an anode connected to the negative output terminal of the DC power-supply device; a first switching diode having an anode connected to the cathode of the first constant current diode and a cathode connected to the one end of the center-tapped primary coil; a second constant current diode having an anode connected to the other end of the center-tapped primary coil; a second Zener diode having a cathode connected to the cathode of the second constant current diode and the base of the transistor forming the first switching element and an anode connected to the negative output terminal of the DC power-supply device; and a second switching diode having an anode connected to the cathode of the second constant current diode and a cathode connected to the other end of the center-tapped primary coil, wherein a current passing through the first constant current diode and the first Zener diode from the one end of the center-tapped primary coil drives the transistor forming the second switching element, the charge of the base of the second transistor at this point is discharged to the one end of the primary coil through the first switching diode, the second transistor is completely placed into a non-conducting state, a current passing through the second constant current diode and the second Zener diode from the other end of the center-tapped primary coil drives the transistor forming the first switching element, the charge of the base of the first transistor at this point is discharged to the other end of the primary coil through the second switching diode, and the first transistor is placed into a non-conducting state.

With this configuration, the DC current supplied to the center-tapped primary coil from the DC power-supply device through the DC choke is supplied to the first Zener diode through the first constant current diode or to the second Zener diode through the second constant current diode, the Zener voltage of the first Zener diode or the second Zener diode is applied to the base of the transistor forming the first switching element or the base of the transistor forming the second switching element, and one of the first switching element and the second switching element is turned on when the Zener voltage reaches a predetermined base voltage with a small time delay, so that the circuit is raised. When the first switching element is driven, the charge of the base of the second switching element is discharged through the first switching diode. When the second switching element is driven, the charge of the base of the first switching element is discharged by the second switching diode. Thus, a stable switching operation can be achieved.

At this point, even if the switching timing of the switching elements is shifted so that the elements are simultaneously turned on, a loop circuit including the switching elements is not fed with a circulating current in response to the operations of the switching elements, reducing an energy loss. This is because a capacitor connected to the switching elements is absent.

The constant current diode is used to raise the Zener voltage for supplying the base voltage of the transistor forming the switching element, so that the Zener voltage is stably raised without causing a time delay and a more stable switching operation is achieved.

Advantageous Effects of Invention

According to contactless power-feed equipment of the present invention, even if the switching timing of the switching elements is shifted so that the elements are simultaneously turned on, a loop circuit including the switching elements is not fed with a circulating current in response to the operations of the switching elements, reducing an energy loss. This is because a capacitor connected to the switching elements is absent and first and second diodes are provided. Furthermore, the recovery current of the diodes causes an instant current flow at the application of a reverse voltage. Since only the primary coil is connected, it is possible to prevent the circulating current from passing through the loop circuit, reducing an energy loss.

According to the contactless power-feed equipment of the present invention, a constant current diode is used to raise a Zener voltage for supplying the base voltage of the transistor forming the switching element, so that the Zener voltage is stably raised without causing a time delay and a more stable switching operation is achieved.

DETAILED DESCRIPTION OF THE INVENTION

Embodiments of the present invention will be described below with reference to the accompanying drawings.

First Embodiment

Figure 1:
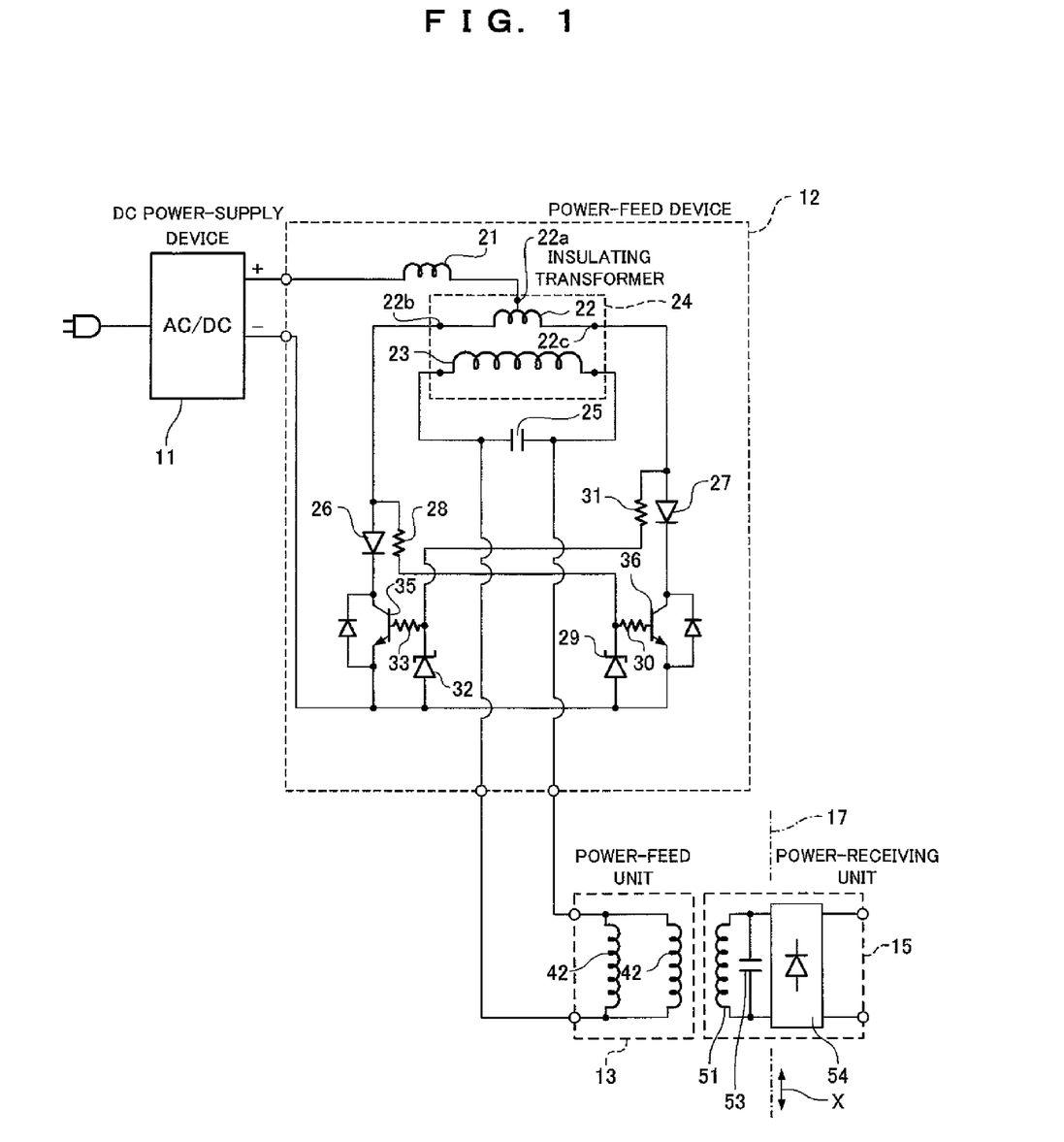
FIG. 1 is a circuit diagram illustrating contactless power-feed equipment according to a first embodiment of the present invention.

FIG. 1 is a circuit diagram illustrating contactless power-feed equipment according to a first embodiment of the present invention.

As shown in FIG. 1, a primary side (power-feed side) includes a DC power-supply device 11, a power-feed device 12, and a power-feed unit 13 and a secondary side (power-receiving side) includes a power-receiving unit 15. The power-feed unit 13 is disposed at a predetermined position where a moving device (not shown) including the power-receiving unit 15 is held. In FIG. 1, a chain line indicates a travel path 17 of the device.

The DC power-supply device 11 receives power from a commercial AC power supply, converts an AC current to a DC current, and supplies the DC current of a rated DC voltage to the power-feed device 12.

The power-feed device 12 includes:

a DC choke 21 that has one end connected to the positive output terminal of the DC power-supply device 11 and is fed with the DC current;

an insulating transformer 24 including a center-tapped primary coil 22 that has a center tap 22a connected to the other end of the DC choke 21 and a secondary coil 23 that is opposed to the primary coil 22 and is connected to an induction coil 42 (will be described later) of the power-feed unit 13;

a resonance capacitor 25 that is connected in parallel with the secondary coil 23 of the insulating transformer 24 and forms a resonance circuit with the induction coil 42 of the power-feed unit 13 at a predetermined frequency;

a first diode 26 having an anode connected to one end 22b of the center-tapped primary coil 22;

a second diode 27 having an anode connected to another end 22c of the center-tapped primary coil 22;

a first resistor 28 and a first Zener diode 29 that are connected in series between the one end 22b of the center-tapped primary coil 22 and the negative output terminal of the DC power-supply device 11;

a first gate resistor 30 having one end connected to the junction of the first resistor 28 and the first Zener diode 29;

a second resistor 31 and a second Zener diode 32 that are connected in series between the other end 22c of the center-tapped primary coil 22 and the negative output terminal of the DC power-supply device 11;

a second gate resistor 33 having one end connected to the junction of the second resistor 31 and the second Zener diode 32;

a first (NPN) transistor (an example of a first switching element) 35 having a surge killer (diode), the first transistor having a collector connected to the cathode of the first diode 26, an emitter connected to the negative output terminal of the DC power-supply device 11, and a base connected to the other end of the second gate resistor 33;

a second (NPN) transistor (an example of a second switching element) 36 having a surge killer (diode), the second transistor having a collector connected to the cathode of the second diode 27, an emitter connected to the negative output terminal of the DC power-supply device 11, and a base connected to the other end of the first gate resistor 30; and an air-cooling fin (not shown) where these components are disposed.

The cathode of the first Zener diode 29 is connected to the one end 22b of the center-tapped primary coil 22 via the first resistor 28. The anode of the first Zener diode 29 is connected to the negative output terminal of the DC power-supply device 11. The cathode of the second Zener diode 32 is connected to the other end 22c of the center-tapped primary coil 22 via the second resistor 31. The anode of the second Zener diode 32 is connected to the negative output terminal of the DC power-supply device 11.

In the configuration of the power-feed device 12, a current passing through the first Zener diode 29 from the one end 22b of the center-tapped primary coil 22 drives the second transistor 36 and a current passing through the second Zener diode 32 from the other end 22c of the center-tapped primary coil 22 drives the first transistor 35.

Figure 2:
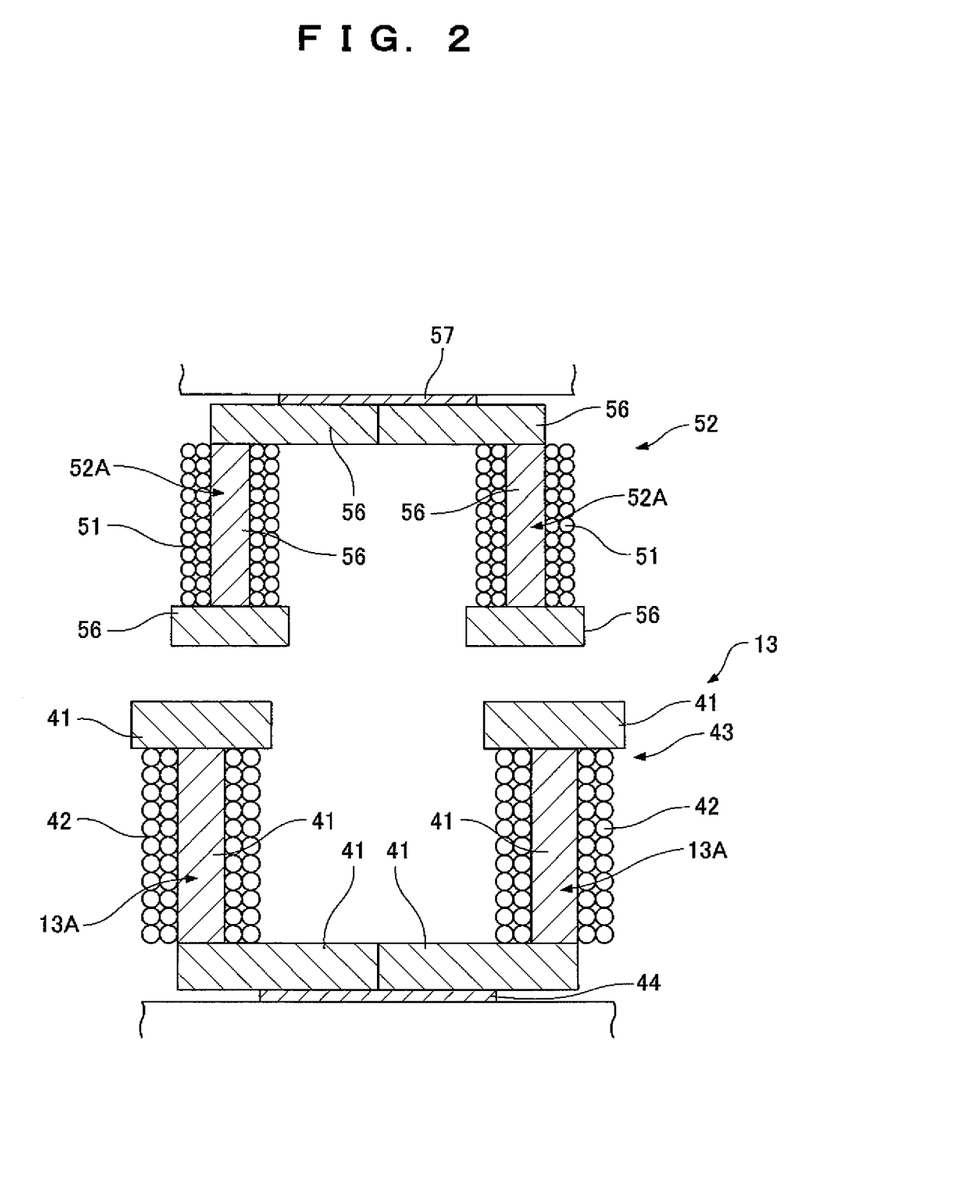
FIG. 2 is a cross-sectional view illustrating induction coils and power-receiving coils of the contactless power-feed equipment.
Figure 3:
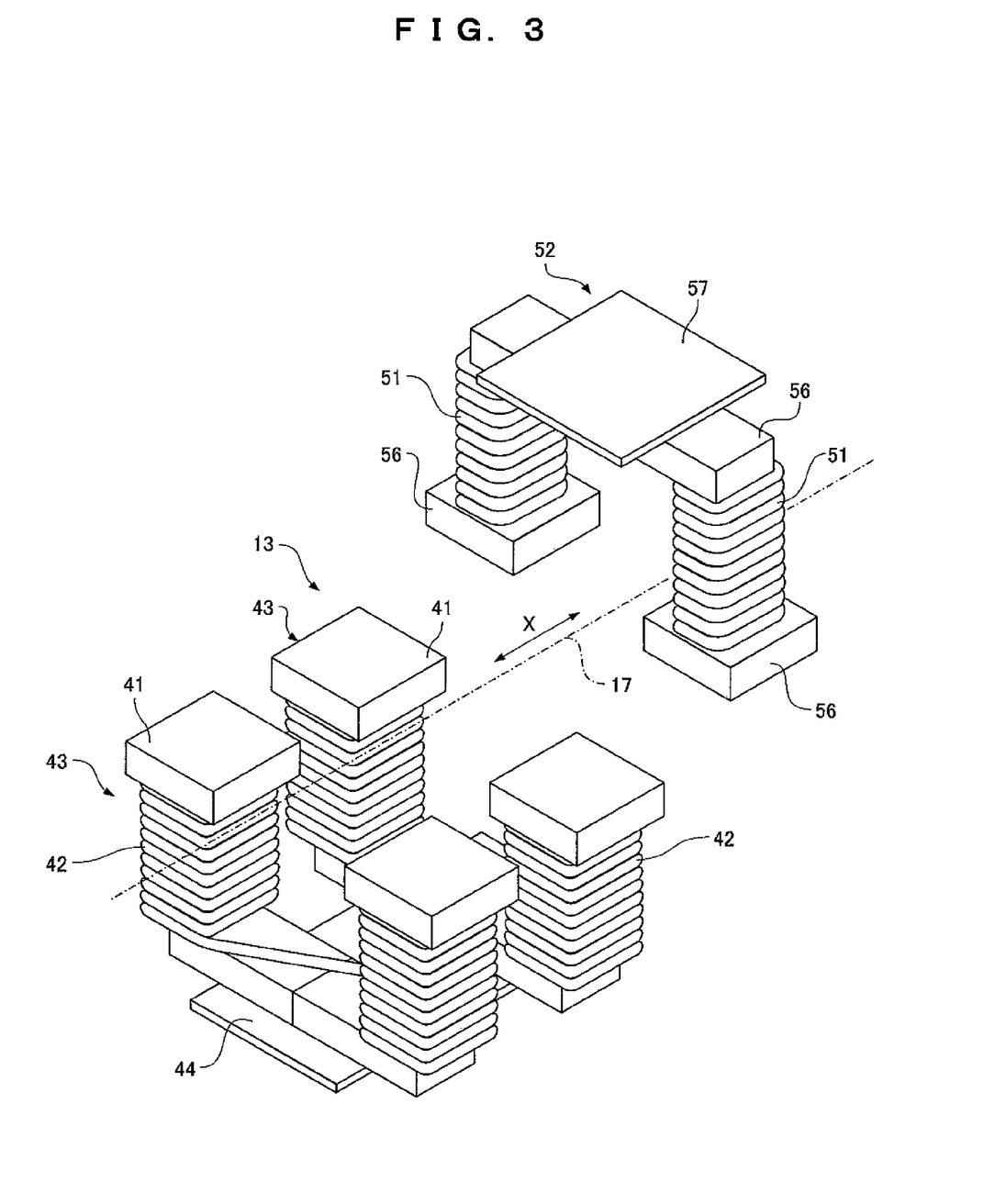
FIG. 3 is a perspective view showing the induction coils and the power-receiving coils of the contactless power-feed equipment.

As shown in FIGS. 2 and 3, the power-feed unit 13 has flat ferrite core members 41 combined in channel shape in side view. The ferrite core members 41 are horizontally combined with the ends of legs 13A. The channel-shaped legs 13A are each wound with an induction coil 42 to form a power-feed member 43. The two power-feed members 43 are disposed on an aluminum floor part 44 such that channel-shaped spaces are arranged in series in moving direction X of the power-receiving unit 15.

As shown in FIG. 1, the power-receiving unit 15 includes a power-receiving member 52 (FIG. 2) wound with power-receiving coils 51, a resonance capacitor 53 that forms a resonance circuit at a resonance frequency, which will be described later, with the power-receiving coils 51, and a rectifier 54 that is connected in parallel with the resonance capacitor 53.

As shown in FIGS. 2 and 3, the power-receiving member 52 has flat ferrite core members 56 combined in channel shape in side view. The ferrite core members 56 are horizontally combined with the ends of channel-shaped legs 52A. The channel-shaped legs 52A are wound with the power-receiving coils 51 and are fixed on an aluminum floor part 57. A voltage generated in the power-receiving member 52 is limited to a predetermined voltage or lower because of the saturation voltages of the ferrite core members 56. As shown in FIGS. 2 and 3, the ferrite core members 56 of the power-receiving member 52 (power-receiving coils 51) are smaller in size than the ferrite core members 41 of the power-feed unit 13 (induction coils 42) and the shape (dimensions) of the power-receiving member 52 is smaller than the shape (dimensions) of the power-feed member 43.

As shown in FIG. 2, the power-receiving member 52 (power-receiving coils 51) is moved such that the ferrite core members 56 disposed on the ends of the legs 52A of the power-receiving member 52 are opposed to the ferrite core members 41 disposed on the ends of the four legs 13A of the power-feed unit 13.

The operations of the configuration will be described below.

1. When the DC power-supply device 11 is connected to a commercial power supply, a DC current is supplied to the DC choke 21 of the power-feed device 12. In this state, the first transistor 35 and the second transistor 36 are both turned off.

2. The DC current supplied to the DC choke 21 varies in flowability depending on, for example, the forward voltages of the diodes 26 and 27, variations in the characteristics of the transistors 35 and 36, and the resistance errors of the resistors 28, 30, 31, and 33 even if the ratings of components are the same. In this case, it is assumed that a current passes through the second Zener diode 32 from the other end 22c of the center-tapped primary coil 22, the first transistor 35 has a base voltage of 0.7 V, and then the first transistor 35 is first turned on (conducting).

3. Thus, the DC current supplied to the DC choke 21 passes through the one end 22b, the first diode 26, and the first transistor 35 from the center tap 22a of the primary coil 22 and then flows to the first Zener diode 29 from the one end 22b through the first resistor 28.

The charge of the gate of the first transistor 35 flows to the other end 22c of the center-tapped primary coil 22 through the second gate resistor 33 and the second resistor 31, the first transistor 35 has a gate voltage of 0 V, and the first transistor 35 is turned off (non-conducting). At the same time, the second transistor 36 having a base voltage of 0.7 V is turned on (conducting).

4. The DC current supplied to the DC choke 21 passes through the other end 22c, the second diode 27, and the second transistor 36 from the center tap 22a of the primary coil 22 and then flows to the second Zener diode 32 from the other end 22c through the second resistor 31.

At this point, the charge of the gate of the second transistor 36 flows to the one end 22b of the center-tapped primary coil 22 through the first gate resistor 30 and the first resistor 28, the second transistor 36 has a gate voltage of 0 V, and the second transistor 36 is turned off (non-conducting). At the same time, the first transistor 35 having a base voltage of 0.7 V is turned on (conducting).

These operations are repeated to perform an oscillation.

In this way, the first transistor 35 and the second transistor 36 are alternately turned on. The direction of a current flow to the primary coil 22 is reversed each time the transistors are switched.

5. Accordingly, a current passing through the secondary coil 23 is alternately reversed. The current flow is maximized at the resonance frequency (e.g., 15 kHz) of a circuit including the resonance capacitor 25 and the induction coils 42 of the power-feed unit 13, so that the first transistor 35 and the second transistor 36 are alternately switched at the resonance frequency every 180°. In other words, self-oscillation is obtained at the resonance frequency of the circuit including the resonance capacitor 25 and the induction coils 42 of the power-feed unit 13, and the AC current of the resonance frequency is supplied to the induction coils 42. Thus, a control circuit for driving the first transistor 35 and the second transistor 36 is not necessary.

6. When the power-receiving unit 15 facing the power-feed unit 13 moves, magnetic fluxes generated on the induction coils 42 cause a large electromotive force on the power-receiving coils 51 that resonate at the frequency of the induction coil 42. An AC current generated by the electromotive force is supplied to the rectifier 54 and then a DC current rectified by the rectifier 54 is supplied to the load of the device. At this point, the power-receiving coils 51 of the device lead to an increase in the impedance of a circuit connected to the resonance capacitor 25 of the power-feed device 12. Thus, the frequency of the AC current passing through the induction coils 42 falls below (e.g., to 14 kHz) the predetermined frequency (the resonance frequency of the circuit including the resonance capacitor 25 and the induction coils 42) and a self-oscillation frequency decreases, accordingly. The power-receiving coils 51 and the resonance capacitor 53 of the power-receiving unit 15 are selected such that the reduced frequency (e.g., 14 kHz) serves as a resonance frequency. Moreover, a voltage generated on the power-receiving member 52 (power-receiving coils 51) is limited to the predetermined voltage or lower because of the saturation voltages of the ferrite core members 56, thereby limiting the received power of the power-receiving unit 15.

As has been discussed, according to the first embodiment, even if the switching timing of the transistors 35 and 36 is shifted so that the elements are simultaneously turned on, a loop circuit including the transistors 35 and 36 is not fed with a circulating current in response to the operations of the transistors 35 and 36 or is not fed with a noise current generated upon the switching of the transistors 35 and 36, reducing an energy loss. This is because a capacitor connected to the transistors 35 and 36 is absent and the first and second diodes 26 and 27 are provided. Furthermore, the recovery current of the diodes 26 and 27 causes a current flow at the application of a reverse voltage. Since only the primary coil 22 is connected, it is possible to prevent the circulating current from passing through the loop circuit, achieving a smaller energy loss and higher efficiency.

According to the first embodiment, the self-oscillation of the transistors 35 and 36 can eliminate the need for a control circuit for driving the transistors 35 and 36.

According to the first embodiment, in the case where the power-receiving unit 15 is not present, a current passes through the induction coils 42 at a higher frequency than in the presence of the power-receiving unit 15. Thus, only a small current is required, reducing an energy loss in the absence of the power-receiving unit 15.

According to the first embodiment, the ferrite core member 56 of the power-receiving coil 51 is smaller in size than the ferrite core member 41 of the induction coil 42. Thus, even if the position of the ferrite core member 56 of the power-receiving coil 51 is displaced from the position of the ferrite core member 41 of the induction coil 42, a voltage required for the power-receiving coil 51 can be induced.

According to the first embodiment, a voltage generated on the power-receiving member 52 is limited to the predetermined voltage or lower because of the saturated voltages of the ferrite core members 56. Thus, the received power of the power-receiving unit 15 is limited, preventing an overload on the induction coil 42 (primary bide).

Second Embodiment

Figure 4:
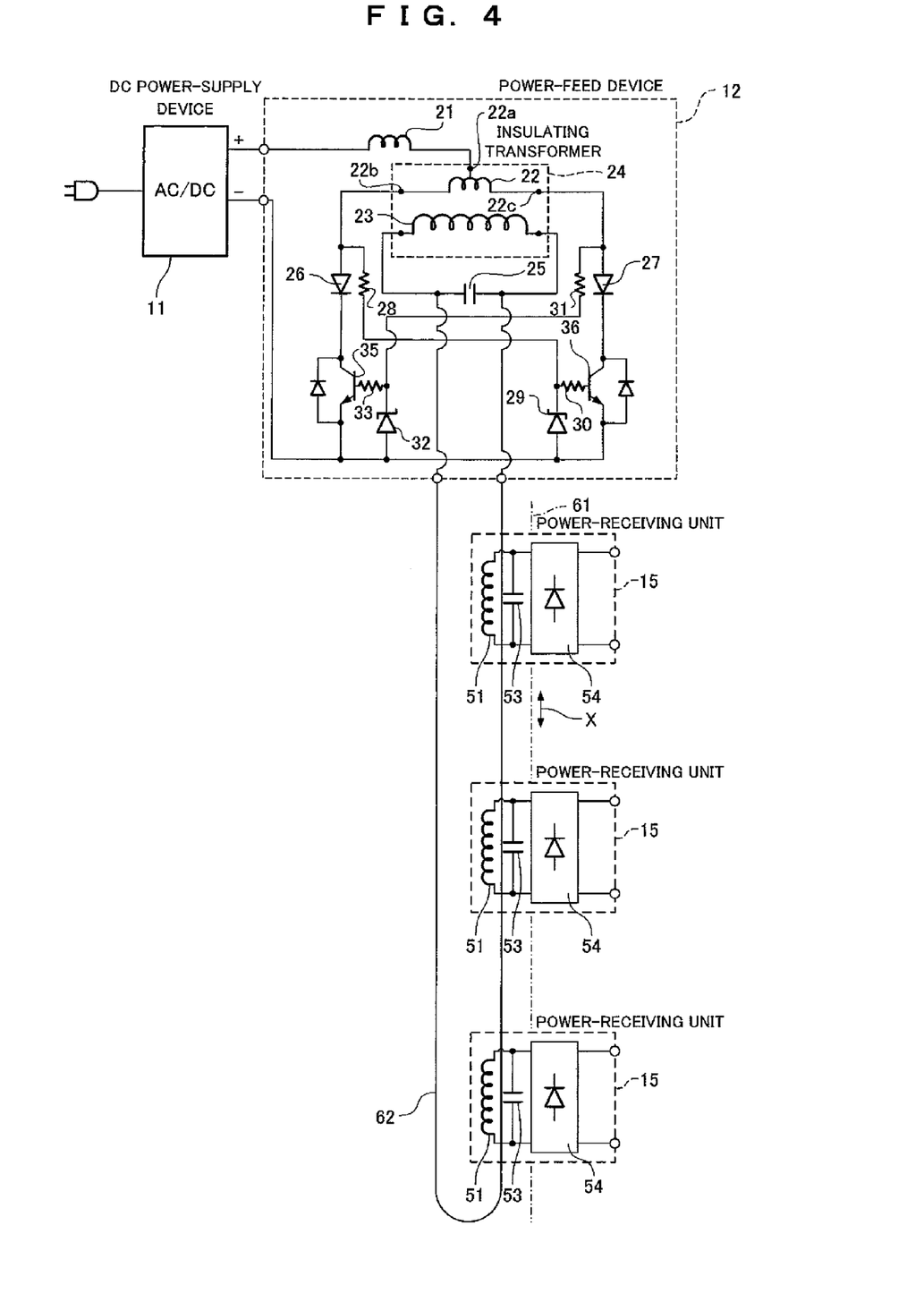
FIG. 4 is a circuit diagram illustrating contactless power-feed equipment according to a second embodiment of the present invention.

FIG. 4 is a circuit diagram illustrating contactless power-feed equipment according to a second embodiment of the present invention. The same circuit configurations as in the first embodiment are indicated by the same reference numerals and the explanation thereof is omitted.

In the first embodiment, the power-feed unit 13 is connected to the resonance capacitor 25, whereas in the second embodiment, as shown in FIG. 4, an induction line 62 forming a resonance circuit with a resonance capacitor 25 at a predetermined frequency is connected instead of the power-feed unit 13. The induction line 62 is laid along a travel path 61 of movable bodies. Power-receiving units 15 are mounted on the movable bodies and receive power from the induction line 62.

The detailed operations are similar to those of the first embodiment and thus the explanation thereof is omitted.

When power is fed to the power-receiving units 15 from the induction line 62, the impedance of a circuit connected to the resonance capacitor 25 of a power-feed device 12 fluctuates with the power of a load connected to the power-receiving unit 15, changing a resonance frequency. Thus, an electromotive force fluctuates that is induced to the power-receiving unit 15. The movable bodies need to be rated so as to feed power to the load even if the fluctuation of the electromotive force varies with a frequency fluctuation.

Third Embodiment

Figure 5:
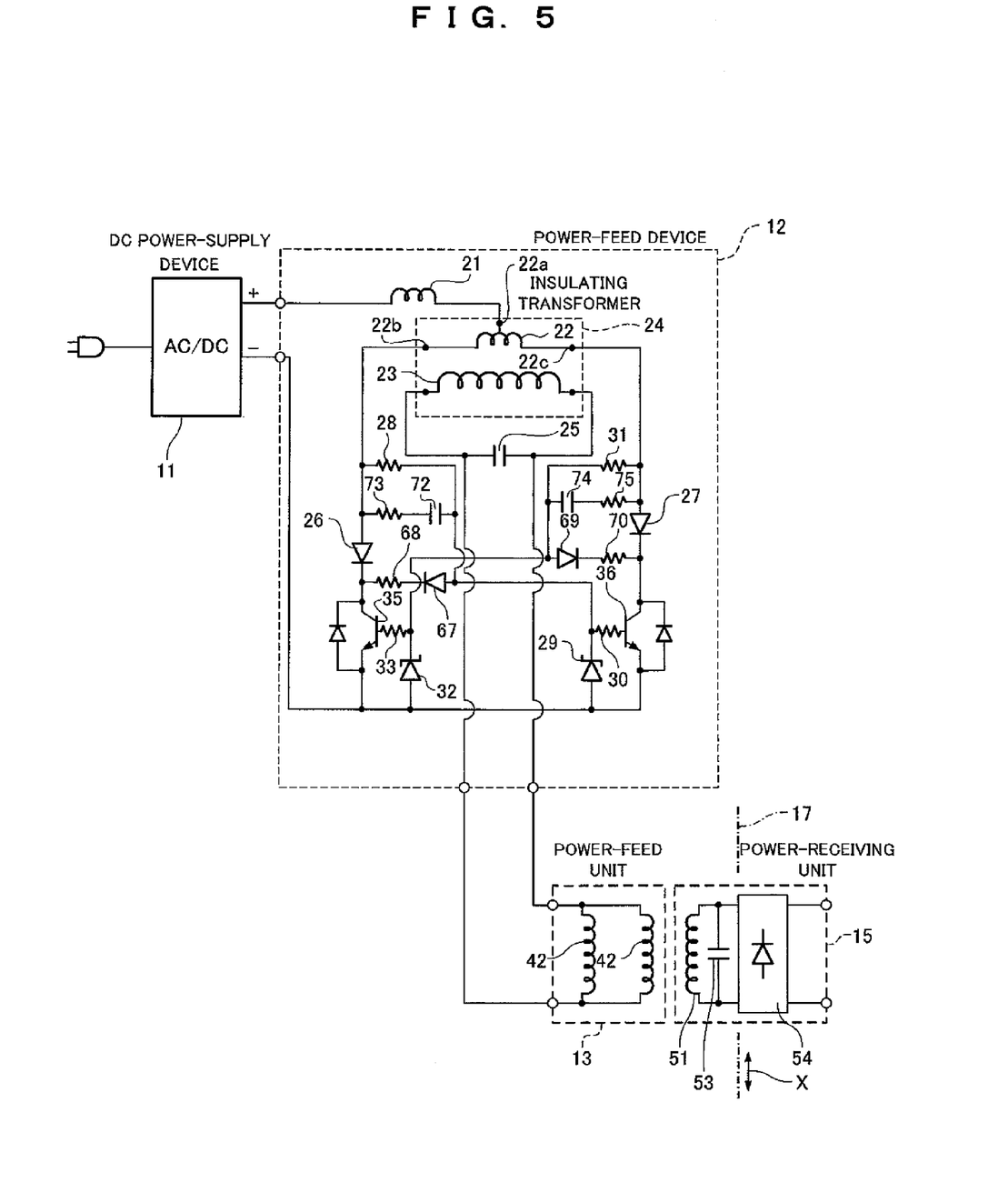
FIG. 5 is a circuit diagram illustrating contactless power-feed equipment according to a third embodiment of the present invention.

FIG. 5 is a circuit diagram illustrating contactless power-feed equipment according to a third embodiment of the present invention. The same circuit configurations as in the first embodiment are indicated by the same reference numerals and the explanation thereof is omitted.

In the first embodiment, when the transistors 35 and 36 are switched, the gate charges of the transistors 35 and 36 to be placed into a non-conducting state are released through the resistors 31, 33, 28, and 30 to reduce the gate voltages. In the case where a load increases and the center-tapped primary coil 22 needs a large primary current, the gate voltages may be slowly reduced and thus the transistors 35 and 36 may be slowly switched, precluding the acquisition of a secondary current at a desired high frequency (e.g., 15 kHz).

In the third embodiment, as shown in FIG. 5, the contactless power-feed equipment further includes: a discharge bypass circuit that quickly attenuates the gate charges of transistors 35 and 36 to quickly reduce the gate voltage to 0 V (discharging); and a gate quick-charge circuit that quickly charges the gates of the transistors 35 and 36 to rapidly increase the gate voltages, so that the transistors 35 and 36 can be quickly switched and a secondary current is obtained at a desired high frequency even if a large current is applied.

Specifically, the discharge bypass circuit includes:

a diode 67 having an anode connected to the junction of a first resistor 28 and a first Zener diode 29;

a resistor 68 having one end connected to the cathode of the diode 67 and the other end connected to the cathode of a diode 26;

a diode 69 having an anode connected to the junction of a second resistor 31 and a second Zener diode 32;

a resistor 70 having one end connected to the cathode of the diode 69 and the other end connected to the cathode of a diode 27.

The gate quick-charge circuit includes:

a capacitor 72 having one end connected to the junction of the first resistor 28 and the first Zener diode 29;

a resistor 73 having one end connected to the other end of the capacitor 72 and the other end connected to one end 22b of a center-tapped primary coil 22;

a capacitor 74 having one end connected to the junction of the second resistor 31 and the second Zener diode 32; and a resistor 75 having one end connected to the other end of the capacitor 74 and the other end connected to another end 22c of the center-tapped primary coil 22.

The addition of the discharge bypass circuit makes it possible to quickly discharge the gate voltages of the transistors 35 and 36 to be placed into a non-conducting state. The addition of the gate quick-charge circuit makes it possible to quickly raise the gate voltages of the transistors 35 and 36 to be placed into a conducting state. Thus, even in the case where the center-tapped primary coil 22 needs to be fed with a large primary current, the transistors 35 and 36 can be quickly switched to obtain a secondary current at a desired high frequency.

In the third embodiment, a power-feed unit 13 is connected to a power-feed device 12. An induction line 62 may be connected instead.

Fourth Embodiment

Figure 6:
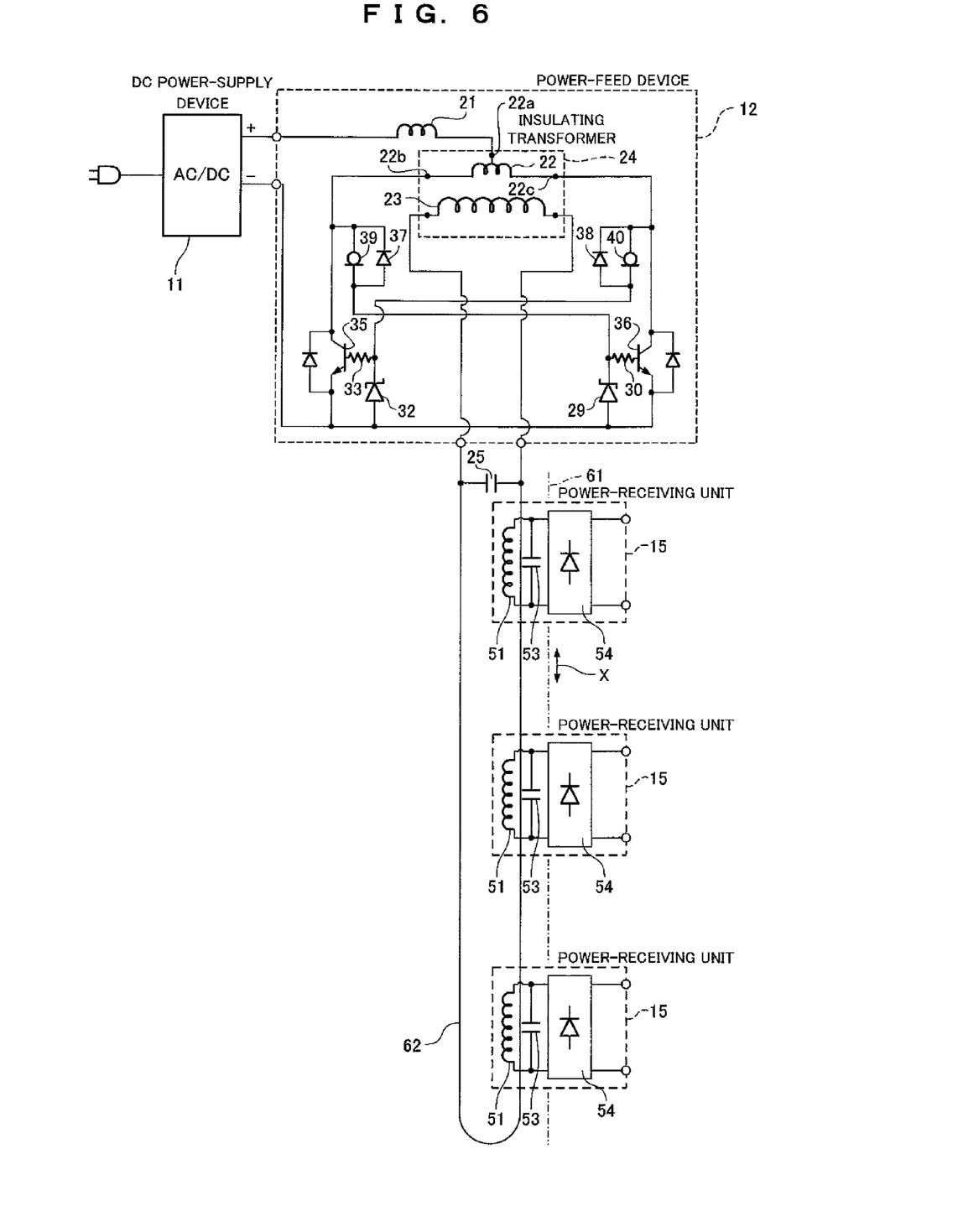
FIG. 6 is a circuit diagram illustrating contactless power-feed equipment according to a fourth embodiment of the present invention.

FIG. 6 is a circuit diagram illustrating contactless power-feed equipment according to a fourth embodiment of the present invention. The same circuit configurations as in the first embodiment are indicated by the same reference numerals and the explanation thereof is omitted.

The contactless power-feed equipment of the fourth embodiment is different from the contactless power-feed equipment of the first embodiment as follows:

The first diode 26 is removed and the collector of a first (NPN) transistor (an example of a first switching element) 35 is connected to one end 22b of a center-tapped primary coil 22.

The second diode 27 is removed and the collector of a second (NPN) transistor (an example of the first switching element) 36 is connected to another end 22c of the center-tapped primary coil 22.

A first constant current diode 39 and a first switching diode 37 are provided instead of the first resistor 28. The first constant current diode 39 has an anode connected to the one end 22b of the center-tapped primary coil 22 and a cathode connected to the cathode of a first Zener diode 29. The first switching diode 37 has an anode connected to the cathode of the first constant current diode 39 and a cathode connected to the one end 22b of the center-tapped primary coil 22.

A second constant current diode 40 and a second switching diode 38 are provided instead of the second resistor 31. The second constant current diode 40 has an anode connected to the other end 22c of the center-tapped primary coil 22 and a cathode connected to the cathode of a second Zener diode 32. The second switching diode 38 has an anode connected to the cathode of the second constant current diode 40 and a cathode connected to the other end 22c of the center-tapped primary coil 22.

A resonance capacitor 25 is provided outside a power-feed device 12 and is connected in parallel with the power-feed device 12.

Instead of the power-feed unit 13, an induction line 62 is connected that forms a resonance circuit with the resonance capacitor 25 at a predetermined frequency.

The operations of the configuration will be described below.

1. When a DC power-supply device 11 is connected to a commercial power supply, a DC current is supplied to a DC choke 21 of the power-feed device 12. In this state, the first transistor 35 and the second transistor 36 are both turned off.
2. The DC current supplied to the DC choke 21 varies in flowability depending on, for example, the forward voltages of the constant current diodes 39 and 40 and variations in the characteristics of the transistors 35 and 36 even if the ratings of components are the same. In this case, it is assumed that a current flows to the second Zener diode 32 from the other end 22c of the center-tapped primary coil 22 through the second constant current diode 40, the base voltage of the first transistor 35 is at least a threshold voltage, and the first transistor 35 is first turned on (conducting).
3. When the first transistor 35 is first turned on (conducting), the DC current supplied to the DC choke 21 passes through the one end 22b and the first transistor 35 from a center tap 22a of the primary coil 22. At this point, the voltage of the one end 22b of the primary coil 22 is substantially 0 V and thus the charge of the base of the second transistor 36 is discharged to the one end 22b of the primary coil 22 through the first switching diode 37, so that the second transistor 36 is completely turned off (non-conducting).
4. Then, the current passing through the first transistor 35 from the primary coil 22 is supplied to the resonance capacitor 25 and the induction line 62 forming a resonance circuit with the resonance capacitor 25, through a secondary coil 23. Thus, the induction line 62 and the resonance capacitor 25 starts resonating at the predetermined frequency and a voltage across the secondary coil 23 is reversed after a certain period of time. Accordingly, the voltage of the other end 22c of the primary coil 22 falls below the voltage of the one end 22b.
5. After that, the charge of the base of the first transistor 35 is discharged to the other end 22c of the primary coil 22 through the second switching diode 38. Thus, when the base voltage of the first transistor 35 falls below the threshold voltage, the first transistor 35 is turned off (non-conducting).
6. When the first transistor 35 is turned off (non-conducting), the voltage of the one end 22b of the primary coil 22 rapidly rises from substantially 0 V to a positive potential. Then, a current flows to the first Zener diode 29 from the one end 22b of the primary coil 22 through the first constant current diode 39 and the current rapidly passes through the base of the second transistor 36, so that the base voltage of the second transistor 36 reaches the threshold voltage or higher and the second transistor 36 is turned on (conducting).
7. When the second transistor 36 is turned on (conducting), the DC current supplied to the DC choke 21 passes through the other end 22c and the second transistor 36 from the center tap 22a of the primary coil 22. Then, the voltage of the other end 22c of the primary coil 22 becomes substantially 0 V and thus the charge of the base of the first transistor 35 is discharged to the one end 22b of the primary coil 22 through the second switching diode 38, so that the first transistor 35 is completely turned off (non-conducting).

These operations are repeated to perform an oscillation.

In this way, the first transistor 35 and the second transistor 36 are alternately turned on. The direction of a current flow to the primary coil 22 is reversed each time the transistors are switched.

8. Accordingly, a current passing through the secondary coil 23 is alternately reversed. The current flow is maximized at the resonance frequency (e.g., 15 kHz) of a circuit including the resonance capacitor 25 and the induction line 62, so that the first transistor 35 and the second transistor 36 are alternately switched at the resonance frequency every 180°. In other words, self-oscillation is obtained at the resonance frequency of the circuit including the resonance capacitor 25 and the induction line 62, and the AC current of the resonance frequency is supplied to the induction line 62. Thus, a control circuit for driving the first transistor 35 and the second transistor 36 is not necessary.
9. Magnetic fluxes generated on the induction line 62 cause a large electromotive force on a power-receiving unit 15 mounted on a movable body. An AC current generated by the electromotive force is supplied to a rectifier 54 and then a DC current rectified by the rectifier 54 is supplied to the load of the movable body. At this point, power-receiving coils 51 of the movable body increase the impedance of a circuit connected to the resonance capacitor 25 of the power-feed device 12. Thus, the frequency of the AC current passing through the induction line 62 falls below (e.g., to 14 kHz) the predetermined frequency (the resonance frequency of the circuit including the resonance capacitor 25 and the induction line 62) and a self-oscillation frequency decreases, accordingly. The power-receiving coils 51 and a resonance capacitor 53 of the power-receiving unit 15 are selected such that the reduced frequency (e.g., 14 kHz) serves as a resonance frequency. Moreover, a voltage generated on a power-receiving member 52 (power-receiving coils 51) is limited to the predetermined voltage or lower because of the saturation voltages of ferrite core members 56, thereby limiting the received power of the power-receiving unit 15.

As has been discussed, according to the fourth embodiment, even if the switching timing of the transistors 35 and 36 is shifted so that the elements are simultaneously turned on, a loop circuit including the transistors 35 and 36 is not fed with a circulating current in response to the operations of the transistors 35 and 36 and the loop circuit is not fed with a noise current generated upon the switching of the transistors 35 and 36. This is because a capacitor connected to the transistors 35 and 36 is not provided. Thus, an energy loss can be reduced and higher efficiency can be obtained.

According to the fourth embodiment, the first constant current diode 39 is provided instead of the first resistor 28 and the second constant current diode 40 is provided instead of the second resistor 31. Thus, the Zener voltage can be stably raised without causing a time delay, achieving a more stable switching operation.

According to the fourth embodiment, the induction path 62 is connected to the power-feed device 12. The power-feed unit 13 may be connected instead.

Fifth Embodiment

Figure 7:
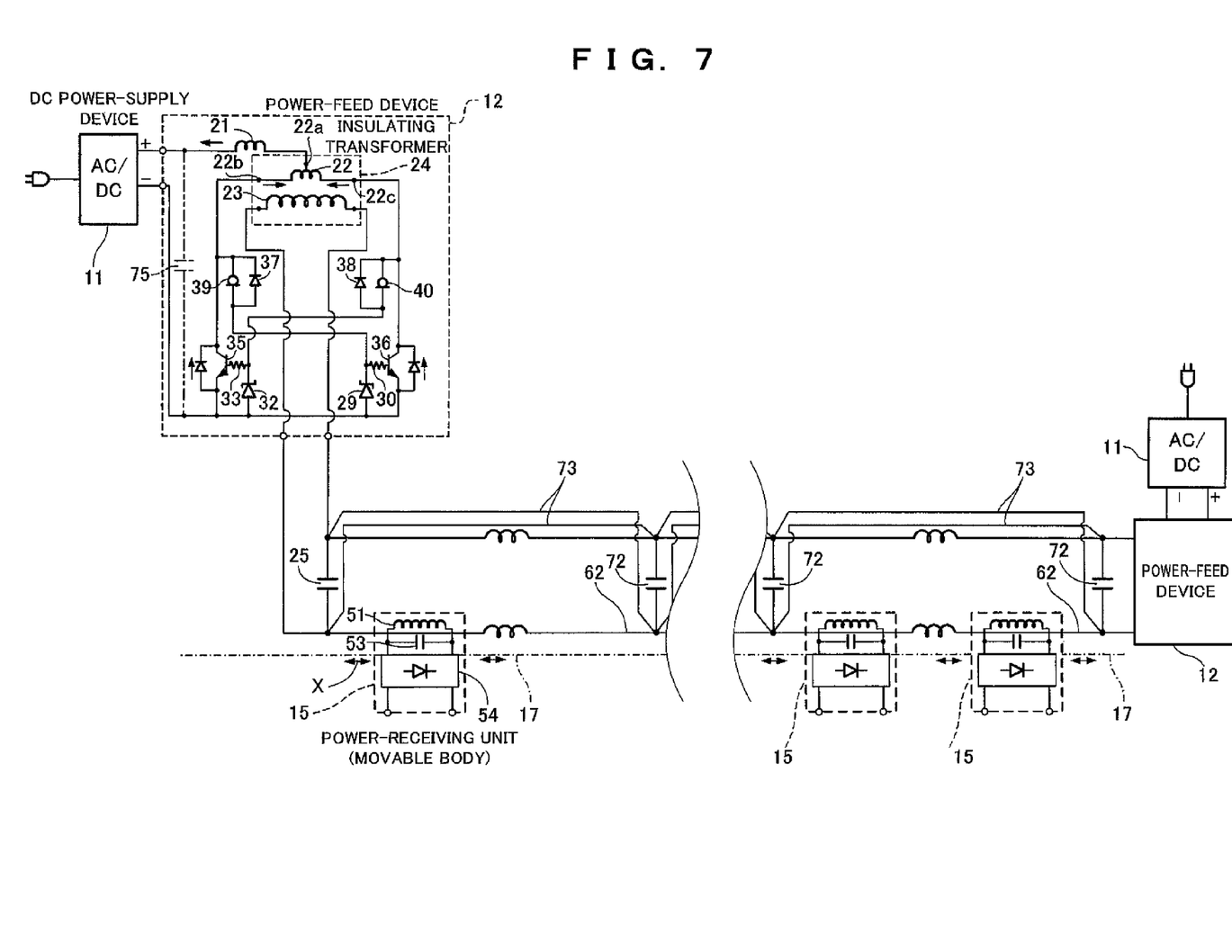
FIG. 7 is a circuit diagram illustrating contactless power-feed equipment according to a fifth embodiment of the present invention.

FIG. 7 is a circuit diagram showing contactless power-feed equipment according to a fifth embodiment of the present invention. The same circuit configurations as in the fourth embodiment are indicated by the same reference numerals and the explanation thereof is omitted.

In the fifth embodiment, two power-feed devices 12 of the fourth embodiment are connected to induction lines 62.

In order to avoid the problem that stable power cannot be obtained from power-receiving coils 51 when movable bodies (power-receiving units 15) concentrate on a predetermined point, a plurality of capacitors 72 are connected in parallel at predetermined intervals between the pair of the induction lines 62. The ends of the adjacent capacitors 72 are connected to each other via a zero-impedance cable 73. The starting end of an induction line 71 configured thus is connected to the power-feed device 12 (one of the power-feed device 12) of the fourth embodiment and the terminal end of the induction line 71 is connected to the power-feed device 12 (the other power-feed device 12) of the fourth embodiment.

With this configuration, the two power-feed devices 12 supply an induced current to the induction lines 62. At this point, the two power-feed devices 12 self-oscillate with the frequency and phase of the same induced current, so that the power-feed devices 12 can supply induced currents in synchronization with each other without cancelling the induced currents, thereby substantially doubling the power source capacity of the overall circuit. Thus, even if the number of movable bodies (power-receiving units 15) receiving power from the induction lines 62 increases, power can be supplied with sufficient stability.

In the case where a storage device (e.g., a battery or an electric double-layer capacitor) 75 is connected between the positive output terminal and the negative output terminal of a DC power-supply device 11 as indicated by a virtual line (chain double-dashed line) in FIG. 7, the storage device 75 can be charged by an induced current supplied to a secondary coil 23 of an insulating transformer 24 connected to the induction lines 62. Specifically, the storage device 75 is charged by forming a closed loop in which a current passing through the secondary coil 23 causes a current to flow to a center-tapped primary coil 22, the current at this point passes through a DC choke 21, the storage device 75, and a diode across a second transistor 36, and a current in opposite phase passes through the DC choke 21, the storage device 75, and a diode across the first transistor 35. In the power-feed device 12 of the fourth embodiment, the diodes 26 and 27 are not provided between the one end 22b of the center-tapped primary coil 22 and the collector of the first transistor 35 and between the other end 22c of the center-tapped primary coil 22 and the collector of the second transistor 36 unlike in the power-feed device 12 of the first embodiment, so that the closed loop is formed.

Hence, in the case where the DC power-supply device 11 is not connected to one of the power-feed devices 12 before the movable bodies are operated (when power supply to the movable bodies is not necessary), the storage device 75 can be charged beforehand by the other power-feed device 12 connected to the DC power-supply device 11. When the operations of the movable bodies are started, a current can be supplied to the induction lines 62 by the two power-feed devices 12. The DC power-supply devices 11 are connected to the respective power-feed devices 12, so that even if a failure occurs on one of the DC power-supply devices 11, discharging from the storage device 75 enables stable current supply to the induction lines 62.

As has been discussed, according to the fifth embodiment, even in the case where the multiple power-feed devices 12 of the fourth embodiment are connected to the induction lines 62, the power-feed devices 12 are synchronized with each other with the same frequency and phase in the circuit without cancelling the generated induced currents. Thus, by simply connecting the two power-feed devices 12 to the pair of induction lines 62, the power source capacity of the overall circuit can be substantially doubled without using any additional measures. Moreover, it is possible to easily respond to an increase in the number of power-receiving units 15 (movable bodies) fed by the induction lines 62, achieving stable power supply.

If the power-feed device 12 includes the storage device 75 in the fifth embodiment, the diverse operations can be performed and power can be stably supplied to the induction lines 62.

According to the fifth embodiment, one of the power-feed devices 12 is connected to the starting end of the induction line 71 and the other power-feed device 12 is connected to the terminal end of the induction line 71. The connected point of the other power-feed device 12 is not limited to the terminal end of the induction line 71 and thus it is obvious that the other power-feed device 12 can be connected to some midpoint of the induction line 71. Thus, the connected point of the power-feed device 12 is more flexibly determined, that is, flexibility in choosing the location of the power-feed device 12 increases, so that the equipment can have higher flexibility.

According to the fifth embodiment, the two power-feed devices 12 are connected to the induction lines 62. The number of power-feed devices 12 is not limited to two and thus more power-feed devices 12 can be connected. The larger the number of power-feed devices 12 connected to the induction lines 62, the larger the power source capacity of the overall circuit, which can respond to an increase in the number of movable bodies on the induction lines 62.

According to the first to fifth embodiments, the transistors 35 and 36 are used as switching elements. Simple switches may be used instead. In this case, a switching controller is necessary for alternately switching a first switching element and a second switching element such that an AC current passes through the secondary coil 23 at the predetermined frequency.

The invention claimed is:

1. Contactless power-feed equipment comprising an induction line placed along a travel path of a movable body and fed with an AC current, or an induction coil that is disposed at a predetermined position for holding a device and fed with an AC current, the movable body including a power-receiving coil on which an electromotive force is induced by a magnetic flux generated on the induction line, or the device including a power-receiving coil on which an electromotive force is induced by a magnetic flux generated on the induction coil, the contactless power-feed equipment comprising:

a DC power-supply device that supplies a DC current;

a DC choke having one end connected to a positive output terminal of the DC power-supply device;

an insulating transformer including a center-tapped primary coil having a center tap connected to another end of the DC choke and a secondary coil connected to one of the induction line and the induction coil;

a resonance capacitor that is connected in parallel with the secondary coil and forms a resonance circuit with one of the induction line and the induction coil at a predetermined frequency;

a first diode having an anode connected to one end of the center-tapped primary coil;

a second diode having an anode connected to another end of the center-tapped primary coil;

a first switching element including a transistor connected between a cathode of the first diode and a negative output terminal of the DC power-supply device;

a second switching element including a transistor connected between a cathode of the second diode and the negative output terminal of the DC power-supply device;

a first Zener diode having a cathode connected to the one end of the center-tapped primary coil and a base of the transistor forming the second switching element and an anode connected to the negative output terminal of the DC power-supply device; and a second Zener diode having a cathode connected to the other end of the center-tapped primary coil and a base of the transistor forming the first switching element and an anode connected to the negative output terminal of the DC power-supply device, wherein a current passing through the first Zener diode from the one end of the center-tapped primary coil drives the transistor forming the second switching element, a current passing through the second Zener diode from the other end of the center-tapped primary coil drives the transistor forming the first switching element, and the transistor forming the first switching element and the transistor forming the second switching element are alternately driven so as to pass the AC current through the secondary coil at the predetermined frequency.

2. The contactless power-feed equipment according to claim 1, wherein the AC current passing through one of the induction line and the induction coil has a frequency that falls below the predetermined frequency in the presence of the power-receiving coil of one of the movable body and the device.

3. The contactless power-feed equipment according to claim 2, wherein a load connected to the power-receiving coil has a rating that is set based on the reduced frequency.

4. The contactless power-feed equipment according to claim 3, wherein the induction coil and the power-receiving coil are each wound around both legs of cores formed in a channel shape in a side view, and a voltage induced on the power-receiving coil is limited to a predetermined voltage or lower because of saturation of the cores.

5. The contactless power-feed equipment according to claim 4, wherein the core of the power-receiving coil is smaller than the core of the induction coil.

6. The contactless power-feed equipment according to claim 2, wherein the induction coil and the power-receiving coil are each wound around both legs of cores formed in a channel shape in a side view, and a voltage induced on the power-receiving coil is limited to a predetermined voltage or lower because of saturation of the cores.

7. The contactless power-feed equipment according to claim 6, wherein the core of the power-receiving coil is smaller than the core of the induction coil.

8. The contactless power-feed equipment according to claim 1, wherein the induction coil and the power-receiving coil are each wound around both legs of cores formed in a channel shape in a side view, and a voltage induced on the power-receiving coil is limited to a predetermined voltage or lower because of saturation of the cores.

9. The contactless power-feed equipment according to claim 8, wherein the core of the power-receiving coil is smaller than the core of the induction coil.

10. Contactless power-feed equipment comprising an induction line placed along a travel path of a movable body and fed with an AC current, or an induction coil that is disposed at a predetermined position for holding a device and fed with an AC current, the movable body including a power-receiving coil on which an electromotive force is induced by a magnetic flux generated on the induction line, or the device including a power-receiving coil on which an electromotive force is induced by a magnetic flux generated on the induction coil, the contactless power-feed equipment comprising:

a DC power-supply device that supplies a DC current;

a DC choke having one end connected to a positive output terminal of the DC power-supply device;

an insulating transformer including a center-tapped primary coil having a center tap connected to another end of the DC choke and a secondary coil connected to one of the induction line and the induction coil;

a resonance capacitor that is connected in parallel with the secondary coil and forms a resonance circuit with one of the induction line and the induction coil at a predetermined frequency;

a first switching element including a transistor connected between one end of the center-tapped primary coil and a negative output terminal of the DC power-supply device;

a second switching element including a transistor connected between another end of the center-tapped primary coil and the negative output terminal of the DC power-supply device;

a first constant current diode having an anode connected to the one end of the center-tapped primary coil;

a first Zener diode having a cathode connected to a cathode of the first constant current diode and a base of the transistor forming the second switching element and an anode connected to the negative output terminal of the DC power-supply device;

a second constant current diode having an anode connected to the other end of the center-tapped primary coil; and a second Zener diode having a cathode connected to a cathode of the second constant current diode and a base of the transistor forming the first switching element and an anode connected to the negative output terminal of the DC power-supply device, wherein a current passing through the first constant current diode and the first Zener diode from the one end of the center-tapped primary coil drives the transistor forming the second switching element, a charge of the base of the second transistor at this point is discharged to the one end of the primary coil, the second transistor is completely placed into a non-conducting state, a current passing through the second constant current diode and the second Zener diode from the other end of the center-tapped primary coil drives the transistor forming the first switching element, a charge of the base of the first transistor at this point is discharged to the other end of the primary coil, and the first transistor is placed into a non-conducting state.

11. The contactless power-feed equipment according to claim 10, further comprising:

a first switching diode having an anode connected to the cathode of the first constant current diode and a cathode connected to the one end of the center-tapped primary coil; and a second switching diode having an anode connected to the cathode of the second constant current diode and a cathode connected to the other end of the center-tapped primary coil.

* * * * *